No. 641,899. Patented Jan. 23, 1900.
C. SHIELDS.
SOLDERING IRON.
(Application filed Mar. 7, 1899.)
(No Model.) 2 Sheets—Sheet 1.
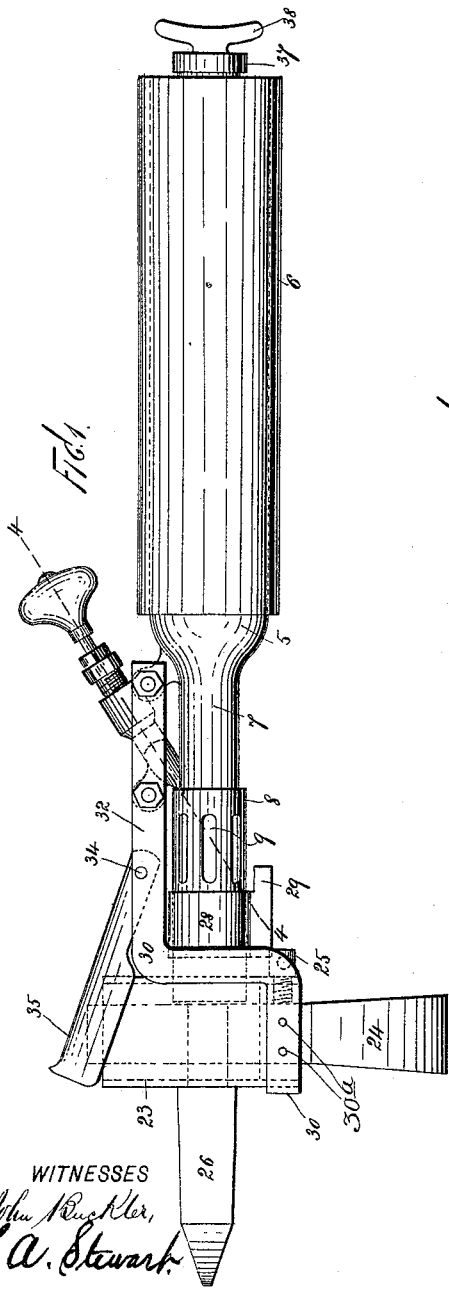
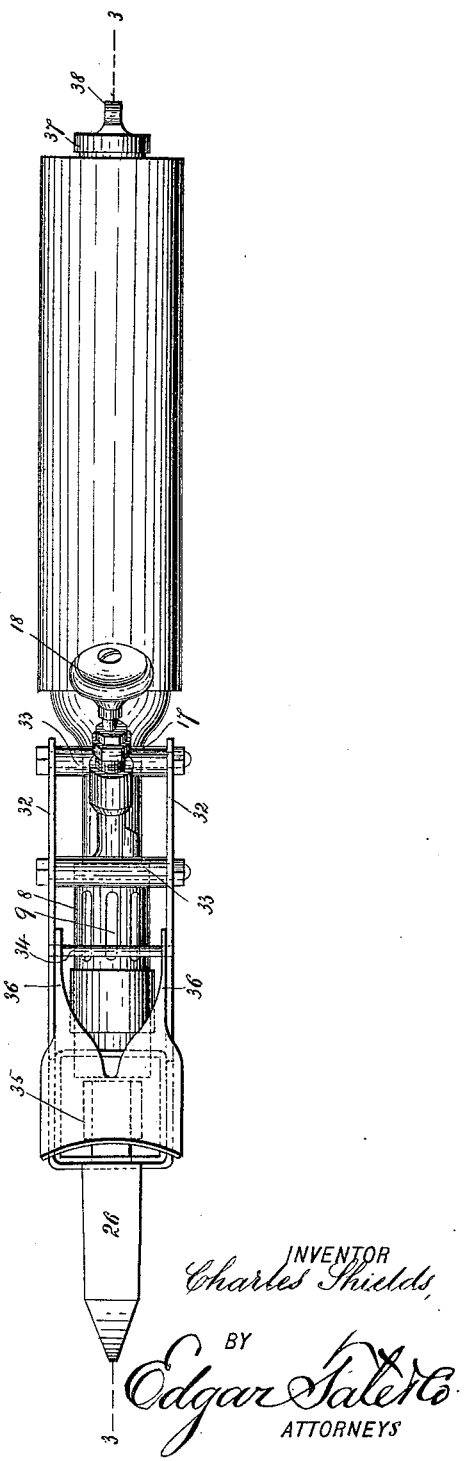
WITNESSES
John Buckler,
F. A. Stewart.
INVENTOR
Charles Shields,
BY
Edgar Tate & Co.
ATTORNEYS No. 641,899. Patented Jan. 23, 1900.
C. SHIELDS.
SOLDERING IRON.
(Application filed Mar. 7, 1899.)
(No Model.) 2 Sheets—Sheet 2.
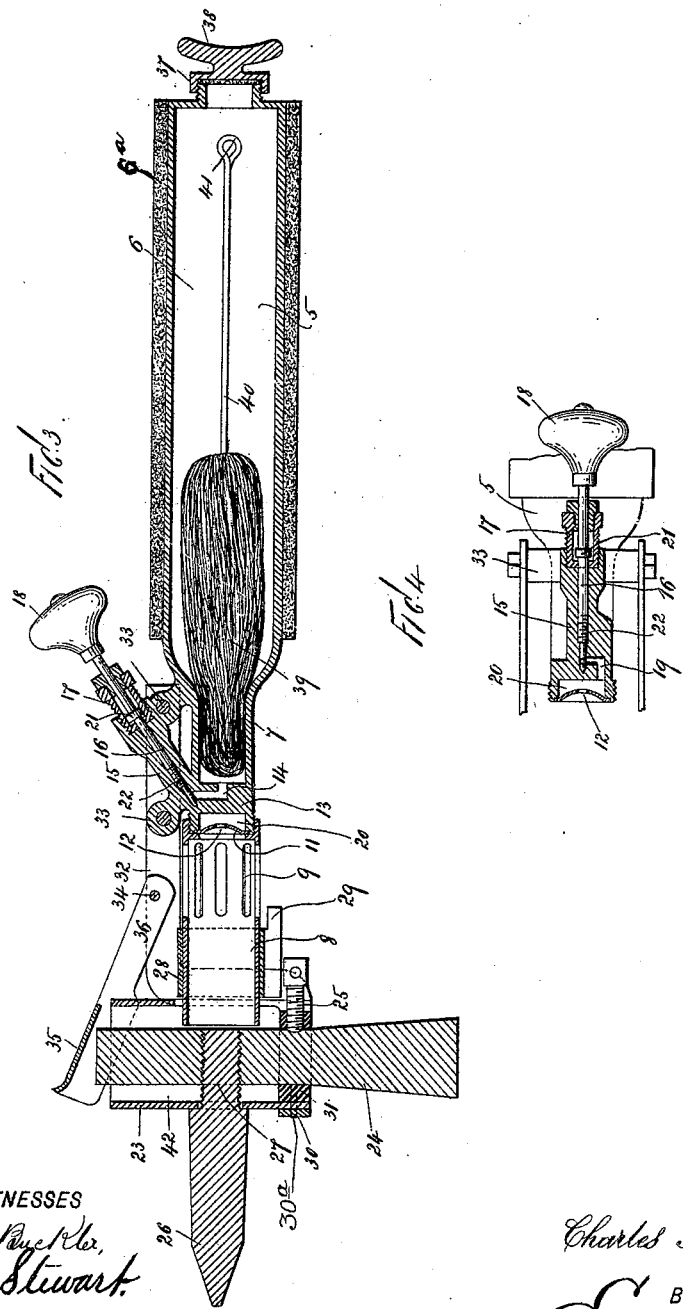
WITNESSES
INVENTOR
Charles Shields
BY
Edgar Tate Co.
ATTORNEYS.

UNITED STATES PATENT OFFICE.

CHARLES SHIELDS, OF NEW YORK, N. Y.

SOLDERING-IRON.

SPECIFICATION forming part of Letters Patent No. 641,899, dated January 23, 1900.

Application filed March 7, 1899. Serial No. 708,085. (No model.)

*To all whom it may concern:*

Be it known that I, CHARLES SHIELDS, a citizen of the United States, residing at New York, (Brooklyn,) in the county of Kings and State of New York, have invented certain new and useful Improvements in Soldering-Irons, of which the following is a full and complete specification, such as will enable those skilled in the art to which it appertains to make and use the same.

This invention relates to soldering-irons; and the object thereof is to provide an improved device of this class which is provided with two separate soldering-irons, one of which is held at an angle to the other, whereby the device is adapted for more convenient use than devices of this class as usually constructed; and with this and other objects in view the invention consists in the construction, combination, and arrangement of parts hereinafter described and claimed.

The invention is fully disclosed in the following specification, of which the accompanying drawings form a part, in which—

Figure 1 is a side view of my improved soldering-iron; Fig. 2, a plan view thereof; Fig. 3, a longitudinal section on the line 3 3 of Fig. 2, and Fig. 4 a partial section on the line 4 4 of Fig. 1.

In the drawings forming part of this specification the separate parts of my improvement are designated by the same numerals of reference in each of the views, and in the practice of my invention I provide a handle 5, which is tubular in form and made hollow to form a reservoir 6, which is adapted to receive benzin or other suitable hydrocarbon, and said handle is preferably provided with a covering 6ª, of asbestos or other suitable material which is not a conductor of heat. The handle 5 is provided at one end with a tubular extension 7, with which is connected a tubular casing 8, provided with longitudinal slots or openings 9, which are designed to admit air, and the tubular extension 7 of the handle 5 is provided at its end with a diaphragm 11, having a small central perforation 12, and adjacent to diaphragm and between the same and the handle 5 is a thick partition 13, provided with an L-shaped bore or passage 14, which is in communication with the reservoir 6 and the interior of the tubular extension 7 of the handle 5, and formed integrally with the tubular extension 7 of the handle 5 and projecting backwardly at an angle, preferably of about forty-five degrees or less, is a valve-tube 15, provided with a small central bore which communicates with the L-shaped bore or passage 14 and in which is mounted a valve-pin 16, which passes through a stuffing-box 17 and is provided with a knob or head 18, which constitutes a handle, and communicating with the inner end of the bore or passage of the valve-tube 15 is an L-shaped bore or passage 19, which communicates with the chamber 20, formed by the diaphragm 11 and the partition 13, as clearly shown in Figs. 3 and 4.

The inner end of the stuffing-box 17 is tubular in form, and the valve-pin 16 is provided within said stuffing-box with a collar 21, which limits the movement of the valve-pin in both directions, and said valve-pin is preferably screw-threaded near its inner end, as shown at 22, and the central bore of the valve-tube 15 is correspondingly screw-threaded.

The tubular casing 8 is provided at its outer end with a transverse head 23, which is preferably angular in cross-section and in which is mounted a transverse soldering-iron 24, which is held in place by a set-screw 25, and said head 23 also carries another soldering-iron 26, provided with a screw-threaded shank 27, which passes through the outer wall of the head 23 and into or through the shank of the soldering-iron 24.

Mounted on the tubular casing 8 is a sleeve 28, which is free to slide on said tubular casing and which is designed to regulate the amount of air passing through the slots 9, and said sleeve is provided at one side with a handle 29.

The head 23 is preferably larger in cross-section than the shank of the soldering-iron 24, and said head is held in place by a yoke-shaped and L-shaped frame 30, in which one end of said head is secured, and secured in said end of said head is a collar 31, through which the shank of the soldering-iron 24 is passed and through which the set-screw passes. The head 23, frame 30, and collar 31 are all preferably rigidly connected together by means of rivets, as at 30ª in the drawings, and the head 23 is slotted at one side to allow the set-screw 25 to pass therethrough, as shown in the drawings.

The frame 30, which carries the head 23, is provided with parallel arms 32, and these arms are bolted to transverse supports 33, formed integrally with the valve-tube 15 and the tubular extension 7 of the handle 5, and the said frame 30 and head 23 are thus rigidly held in place, and passing transversely through the arms 32 of the frame 30 is a pin 34, on which is mounted a shield 35, said shield being provided with side arms 36, through which the pin 34 is passed. The shield 35 in the operation of the device, as hereinafter described, is turned into the position shown in Figs. 1, 2, and 3, but may be turned into a position at right angles to the tubular casing 8 or even backward parallel with or adjacent to the valve-tube 15.

The outer end of the handle 5 is closed by a screw-cap 37, provided with a knob or head 38, and I also provide a packing 39, composed of wool, cotton, or any other suitable material, which is mounted on a rod 40 and which is adapted to be inserted into the reservoir through the opening closed by the cap 37 and into the tubular extension 7 of the handle, which also forms an extension of the reservoir 6, and the rod 40 is provided at its outer end with an eye 41, through which a hook may be inserted for the withdrawal of the packing 39, when necessary.

The object in forming the head 23 larger than the shank of the soldering-iron 24 is to form a heat-chamber 42 therein, and the operation will be readily understood from the foregoing description, when taken in connection with the accompanying drawings and the following statement thereof.

It will be understood that the valve-pin 15 controls the passages 14 and 19, which lead from the reservoir or the tubular extension 7 thereof into the chamber 20, and in practice the reservoir 6 is filled with benzin or any other suitable hydrocarbon, and a smaller amount of benzin or any suitable oil is placed in a small cup or receptacle and ignited, and the tubular extension 7 of the handle or reservoir is held thereover until the heat of said parts is sufficient to generate vapor. The valve-pin is then manipulated so as to open the passages 14 and 19, and the vapor passes into the chamber 20 and through the smaller perforation 12 in the diaphragm 11 into the tubular casing 8, where it is ignited. At this point air in suitable quantities passes through the slots 9 and mingles with the vapor, and a high degree of heat is produced. This heat is directed onto the soldering-irons 24 and 26 and thoroughly heats the said irons, and the shield 35 in the operation of the device is turned into the position shown in Figs. 1 to 3, inclusive, so as to prevent too much air passing into the head 23 and so as to confine the heat therein.

The handle 5, which forms the wall of the reservoir 6, is made strong enough at all points to stand any pressure that can be generated therein, and the valve-pin 16 is so made as to regulate with the greatest nicety the amount of vapor passing into the chamber 20.

The packing 39 is intended to closely fill and pack the tubular extension 7 of the handle and reservoir, so that the benzin or other hydrocarbon cannot pass into said tubular extension, while at the same time the vapor generated is free to pass through the said packing and through the passages 14 and 19 into the chamber 20, as hereinbefore described.

The entire device is simple in construction and operation and well adapted to accomplish the result for which it is intended, and it will be apparent that changes in and modifications of the construction described may be made without departing from the spirit of my invention or sacrificing its advantages.

Having fully described my invention, I claim as new and desire to secure by Letters Patent—

1. A device of the class described, comprising a tubular handle forming a reservoir open at one end and provided at the other with a tubular extension, said extension being provided with a transverse partition having passages, and the end thereof adjacent to said partition with a diaphragm having a perforation, a tubular casing connected with said extension and inclosing said diaphragm, and provided with side openings for admitting air, and a transverse head connected with said tubular casing and communicating therewith and provided with soldering-irons, one end of said head being closed by a collar, and one of said irons being provided with a shank which is inserted through said collar and into and through said head, and the other iron being provided with a shank which is inserted through the outer side of the said head, and in line with the handle and into the shank of the other iron, said head being also larger in cross-section than the shank of the first-named iron, whereby an annular space is formed around said shank, substantially as shown and described.

2. A device of the class described, comprising a tubular handle forming a reservoir open at one end and provided at the other with a tubular extension, said extension being provided with a transverse partition having passages, and the end thereof adjacent to said partition with a diaphragm having a perforation, a tubular casing connected with said extension and inclosing said diaphragm, and provided with side openings for admitting air, and a transverse head connected with said tubular casing and communicating therewith and provided with soldering-irons, one end of said head being closed by a collar, and one of said irons being provided with a shank which is inserted through said collar and into and through said head, and the other iron being provided with a shank which is inserted through the outer side of the said head, and in line with the handle and into the shank of the other iron, said head being also larger in cross-section than the shank of the first-named iron, whereby an annular space is formed around said shank, said casing being also provided with a valve-tube in communication with the passages in said partition, and a valve-pin mounted in said tube and controlling said passages, substantially as shown and described.

3. A device of the class described, comprising a tubular handle forming a reservoir open at one end and provided at the other with a tubular extension, said extension being provided with a transverse partition having passages, and the end thereof adjacent to said partition with a diaphragm having a perforation, a tubular casing connected with said extension and inclosing said diaphragm, and provided with side openings for admitting air, and a transverse head connected with said tubular casing and communicating therewith and provided with soldering-irons, one end of said head being closed by a collar, and one of said irons being provided with a shank which is inserted through said collar and into and through said head, and the other iron being provided with a shank which is inserted through the outer side of the said head, and in line with the handle and into the shank of the other iron, said head being also larger in cross-section than the shank of the first-named iron, whereby an annular space is formed around said shank, said casing being also provided with a valve-tube in communication with the passages in said partition, and a valve-pin mounted in said tube and controlling said passages, and said handle and said reservoir being provided with a removable packing which is adapted to close said tubular extension, and a rod connected with said packing, whereby it may be inserted and removed, substantially as shown and described.

In testimony that I claim the foregoing as my invention I have signed my name, in presence of the subscribing witnesses, this 4th day of March, 1899.

CHARLES SHIELDS.

Witnesses:
F. A. STEWART,
A. C. MCLOUGHLIN.